United States Patent
Mertz et al.

(10) Patent No.: US 8,971,719 B2
(45) Date of Patent: Mar. 3, 2015

(54) NONLINEARITY COMPENSATION USING PILOT TONES

(71) Applicant: Infinera Corporation, Sunnyvale, CA (US)

(72) Inventors: Pierre Herve Mertz, Baltimore, MD (US); David J. Krause, Nepean (CA); Han Henry Sun, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 71 days.

(21) Appl. No.: 13/725,220

(22) Filed: Dec. 21, 2012

(65) Prior Publication Data

US 2014/0178065 A1     Jun. 26, 2014

(51) Int. Cl.
*H04B 10/00* (2013.01)
*H04B 10/04* (2006.01)
*H04B 10/12* (2006.01)
*H04B 10/556* (2013.01)

(52) U.S. Cl.
CPC .................................. *H04B 10/5561* (2013.01)
USPC ............ 398/158; 398/159; 398/192; 398/193

(58) Field of Classification Search
CPC ............. H04B 10/505; H04B 10/5055; H04B 10/50577; H04B 10/516; H04B 10/524; H04B 2210/25; H04B 2210/252; H04B 2210/254; H04B 2210/516
USPC .............. 398/43, 91, 158, 188, 192, 193, 159
See application file for complete search history.

(56) References Cited

U.S. PATENT DOCUMENTS

| | | | |
|---|---|---|---|
| 8,112,001 B2 * | 2/2012 | Lowery et al. ................ | 398/158 |
| 8,218,979 B2 * | 7/2012 | Liu ............... | 398/208 |
| 8,515,286 B2 * | 8/2013 | Liu et al. ...................... | 398/158 |
| 8,594,515 B2 * | 11/2013 | Liu et al. ...................... | 398/208 |
| 2009/0074415 A1 * | 3/2009 | Xie ................................ | 398/79 |

* cited by examiner

*Primary Examiner* — Dalzid Singh
(74) *Attorney, Agent, or Firm* — Harrity & Harrity LLP; David L. Soltz (57) ABSTRACT

An optical system may have an optical transmitter including a digital signal processor to receive a signal channel, add data corresponding to a pilot tone, generate a digital signal associated with the signal channel and including the pilot tone, and output the digital signal. The optical system may further have a digital-to-analog converter to convert the digital signal to an analog signal, a laser to provide an optical signal, and a modulator to receive the optical signal and the analog signal, and modulate the optical signal based on the analog signal to form a modulated optical signal. The modulated optical signal may include the pilot tone. The optical system may also have an optical receiver to receive the modulated optical signal, process the modulated optical signal to determine a phase associated with the pilot tone, and apply the phase to the modulated optical signal to recover the signal channel.

16 Claims, 5 Drawing Sheets

NONLINEARITY COMPENSATION USING PILOT TONES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a link to transmit the WDM signal to a receiver circuit having a receiver (Rx) PIC. The receiver PIC may include an optical demultiplexer circuit (referred to as a "demultiplexer") configured to receive a WDM signal and demultiplex the WDM signal into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

WDM signals sometimes experience phase noise or some other type of signal degradation during transmission of the WDM signal from a Tx PIC to an Rx PIC.

SUMMARY

According to one example implementation, an optical system may have an optical transmitter including a digital signal processor (DSP) to receive a signal channel, add data corresponding to a pilot tone having a phase, generate a digital signal associated with the signal channel and including the pilot tone, and output the digital signal. The optical system may further have a digital-to-analog converter (DAC) to convert the digital signal to an analog signal, a laser to provide an optical signal, and a modulator to receive the optical signal and the analog signal, and modulate the optical signal based on the analog signal to form a modulated optical signal. The modulated optical signal may include the pilot tone. The optical system may also have an optical receiver configured to receive the modulated optical signal, process the modulated optical signal to determine the phase associated with the pilot tone, and apply the phase to the modulated optical signal to recover the signal channel.

According to another example implementation, an optical system may have an optical transmitter to receive a signal channel, add data corresponding to a pilot tone having a phase, to the signal channel, and generate a digital signal associated with the signal channel. The digital signal may include the pilot tone. The optical transmitter may further convert the digital signal to an analog signal, modulate an optical signal based on the analog signal to form a modulated optical signal, and output the modulated optical signal. The modulated optical signal may include the pilot tone. The optical system may further have an optical receiver to receive the modulated optical signal, process the modulated optical signal to determine the phase associated with the pilot tone, and apply the phase to the modulated optical signal to recover the signal channel.

According to another example implementation, an optical transmitter may have a DSP to receive a signal channel, add data corresponding to a pilot tone having a phase to the signal channel, form a digital signal associated with the signal channel. The digital signal may include the pilot tone. The DSP may further output the digital signal. The optical transmitter may also have a DAC to convert the digital signal to an analog signal, a laser to provide an optical signal, and a modulator to receive the optical signal and the analog signal, modulate the optical signal based on the analog signal to form a modulated optical signal, and output the modulated optical signal for transmission to an optical receiver. The modulated optical signal may include the pilot tone. The optical receiver may process the modulated optical signal to determine the phase associated with the pilot tone and apply the phase to the modulated optical signal to recover the signal channel.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Figure 1:
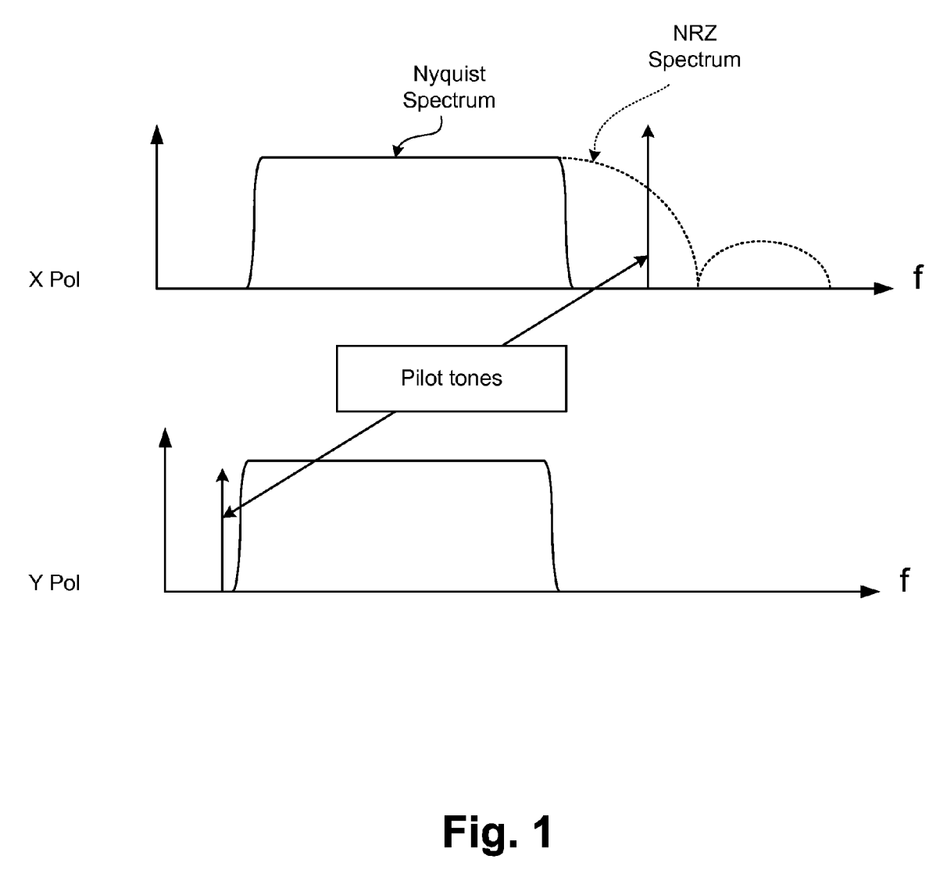
FIG. 1 is a diagram illustrating an overview of an example implementation described herein.

FIG. 1 is a diagram illustrating an overview of an example implementation described herein. In an optical communication system, a signal channel may be illustrated as a spectrum in a frequency domain. As shown in FIG. 1, the signal channel may be associated with a nonreturn-to-zero (NRZ) spectrum. In some implementations, data corresponding to pilot tones may be added to the signal channel to modify the spectrum of the signal channel. As shown in FIG. 1, the data, corresponding to pilot tones, may be added to the spectrum to modify and convert the spectrum from an NRZ spectrum to a Nyquist spectrum. In some implementations, a signal channel having a Nyquist spectrum may have higher spectral efficiency than a signal channel having an NRZ spectrum. As shown in FIG. 1, the data corresponding to pilot tones may be added to a signal channel that is either x-polarized or y-polarized.

In some implementations, the pilot tones may correspond to the addition of a spike in the spectrum. As shown in FIG. 1, the data for the pilot tones may be added to the left side of the spectrum or to the right side of the spectrum (e.g., to modify the shape of the spectrum in electrical signals being either x-polarized or y-polarized). In some implementations, the data for the pilot tones may be added to multiple electrical signals. For example, the data for the pilot tones may be added to electrical signals in the x-polarization (e.g., for the real portion and the imaginary portion of the x-polarization), and to electrical signals in the y-polarization (e.g., for the real portion and the imaginary portion of the y-polarization).

Systems and/or methods, as described herein, may use digital signal processors (DSPs) to provide data, corresponding to pilot tones, to signal channels, associated with a WDM signal, to compensate for nonlinearities in the transmission of the WDM signal, such as cross-phase modulation (XPM) and cross-polarization modulation (XPolM). For example, a DSP may add data (e.g., data corresponding to pilot tones) to an input signal channel to convert a spectrum of the input signal channel from an NRZ spectrum to a Nyquist spectrum. The pilot tones may have a phase that, when identified by a receiving component, may compensate for nonlinearities since XPM nonlinearities on a transmission link may affect both the input signal channel and the pilot tones. In some implementations, multiple DSPs may add data, corresponding to multiple pilot tones, to multiple input signal channels. The multiple DSPs may provide multiple output signal channels to a multiplexer. The multiplexer may combine the multiple output signal channels to form a WDM signal. In some implementations, the WDM signal may include the pilot tones.

In some implementations, a receiving component may decode the WDM signal such that the phase of the decoded WDM signal corresponds to the phase of the pilot tones, thereby removing nonlinearities in the WDM signal and recovering a signal channel associated with the WDM signal. For example, the receiving component may identify the phase, associated with the pilot tone, and apply the phase to the WDM signal when decoding the WDM signal. As a result, the decoded WDM signal may compensate for phase noise (e.g., line width, frequency noise, etc.) in the transmission of the WDM signal, or compensate for cross-fade modulation in a transmission link between the transmitter module and the receiver module. Further, the systems and/or methods may compensate for nonlinearities in WDM signals with components having multiple polarizations (e.g., a transverse magnetic (TM) polarization and/or a transverse electric (TE) polarization).

While a first polarization may be described herein as the TM polarization and a second polarization may be described herein as the TE polarization, in some other implementations, the first polarization may correspond to the TE polarization and the second polarization may correspond to the TM polarization.

Figure 2:
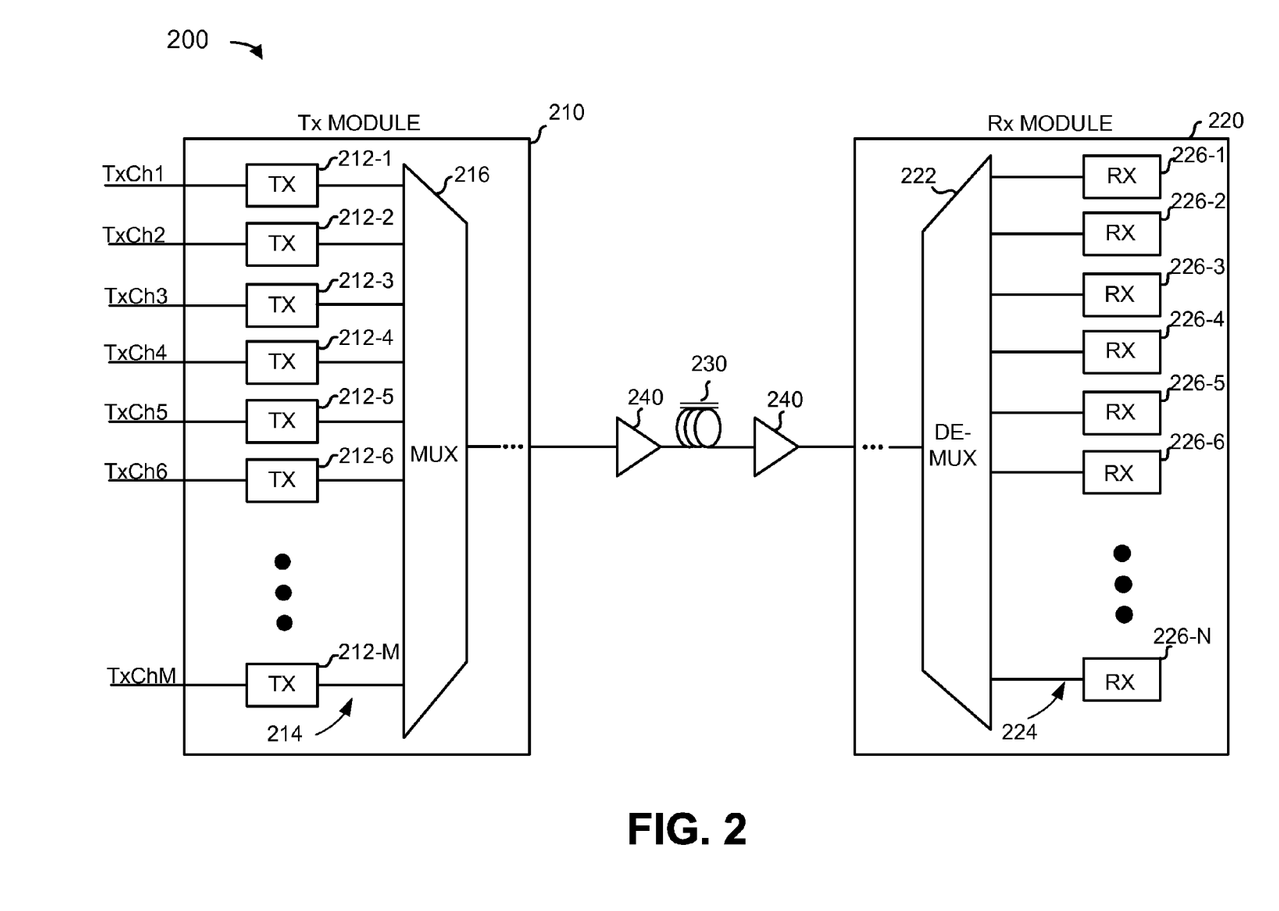
FIG. 2 is a diagram of an example network in which systems and/or methods, described herein, may be implemented.

FIG. 2 is a diagram of an example network 200 in which systems and/or methods described herein may be implemented. As illustrated in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, network 200 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), modulate the data with an optical signal to create an output optical signal, and transmit the output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super-channel.

In some implementations and as described above, each of optical transmitters 212 may include a TX DSP, a digital-to-analog converter (DAC), a laser, a modulator, and/or some other components. The laser and/or the modulator may be coupled with a tuning element that can be used to tune the wavelength of the optical signal channel.

Waveguides 214 may include an optical link or some other link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexer device. In some implementations, optical multiplexer 216 may combine multiple output optical signals, associated with optical transmitters 212, into a single optical signal (e.g., a WDM signal). In some implementations, optical multiplexer 216 may combine multiple output optical signals, associated with optical transmitters 212, in such a way as to produce a polarization diverse signal (e.g., also referred to herein as a WDM signal). A corresponding waveguide may output the WDM signal on an optical fiber, such as link 230. For example, optical multiplexer 216 may include an input (e.g., a first slab to receive input optical signals supplied by optical transmitters 212) and an output (e.g., a second slab to supply a single WDM signal associated with the input optical signals). Optical multiplexer 216 may also include waveguides connecting the first slab and the second slab.

In some implementations, the first slab and the second slab may each act as an input and an output. For example, the first slab and the second slab may each receive multiple input optical signals (e.g., output optical signals supplied by optical transmitters 212). Additionally, the first slab may supply a single WDM signal corresponding to the input optical signals (e.g., output optical signals supplied by optical transmitters 212) received by the second slab. Further, the second slab may supply a single WDM signal corresponding to the input optical signals (e.g., output optical signals supplied by optical transmitters 212) received by the first slab. In some implementations, a corresponding waveguide may output the WDM signal on an optical fiber, such as link 230.

As shown in FIG. 2, optical multiplexer 216 may receive output optical signals outputted by optical transmitters 212, and output one or more WDM signals. Each WDM signal may include one or more optical signals, such that each optical signal includes one or more wavelengths. In some implementations, one WDM signal may have a first polarization (e.g., a TM) polarization, and another WDM signal may have a second, substantially orthogonal polarization (e.g., a TE polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230. In some implementations, XPM nonlinearities on link 230 may affect an optical signal being transmitted via link 230 and the pilot tones included in the optical signal.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other demultiplexer device. Optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connecting the first slab and the second slab.

In some implementations, the first slab and the second slab may each act as an input and an output. For example, the first slab and the second slab may each receive an optical signal (e.g., a WDM signal supplied by optical multiplexer 216 and/or some other optical signal). Additionally, the first slab may supply output optical signals corresponding to the optical signal received by the second slab. Further, the second slab may supply output optical signals corresponding to the optical signal received by the first slab. As shown in FIG. 2, optical demultiplexer 222 may supply optical signals to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, convert data, associated with the input optical signals, to voltage signals, convert the voltage signals to digital samples, and process the digital samples to produce output data corresponding to the input optical signals. Optical receivers 226 may each operate to convert the input optical signal to an electrical signal that represents the transmitted data. In some implementations, each of optical receivers 226 may include a local oscillator, a multimoded-inference (MMI) coupler, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the components illustrated in FIG. 2 may perform a function described herein as being performed by another one of the components illustrated in FIG. 2.

Figure 3:
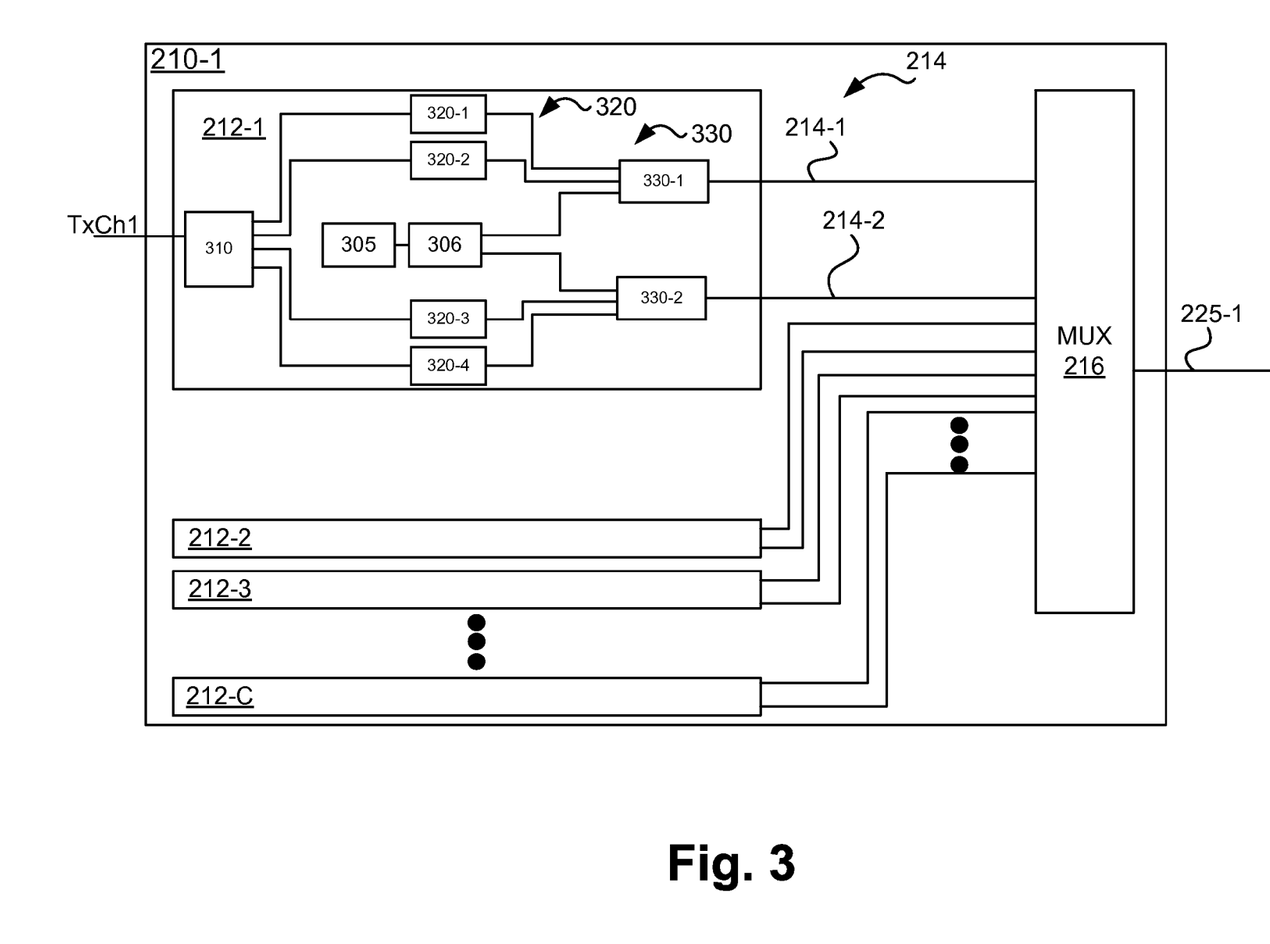
FIG. 3 is a diagram illustrating an example of components of an optical transmitter shown in FIG. 2.

FIG. 3 is a diagram illustrating example elements of transmitter module 210 shown in network 200 of FIG. 1. As shown in FIG. 3, transmitter module 210 may include optical transmitters 212-1 through 221-C (where C≥1), waveguides 214-1 through 214-D (where D≥1), and optical multiplexer 216. As described above, optical transmitters 212 may include laser 305, splitter 306, TX DSP 310, DACs 320, and modulators 330. In some example implementations, components of multiple optical transmitters 212 may be implemented on a single integrated circuit, such as a single PIC, to form a superchannel transmitter.

Laser 305 may include a semiconductor laser, such as a distributed feedback (DFB) laser, or some other type of laser. Laser 305 may provide output optical light to modulators 330. In some implementations, laser 305 may be an optical source for a single corresponding optical transmitter 212. In some implementations, laser 305 may be an optical source that is shared by multiple optical transmitters 212.

Splitter 306 may include an optical splitter that receives the optical light from laser 305 and splits the optical light into multiple branches (e.g., two branches: one for the first polarization and one for the second polarization). In some implementations, the two optical lights may have approximately equal power. Splitter 306 may output one optical light to modulator 330-1 and another optical light to modulator 330-2.

TX DSP 310 may include a processing device or a collection of processing devices. In some implementations, TX DSP 310 may receive a signal channel (e.g., TxChl) and process the signal channel to form four sets of digital signals (e.g., a first set of digital signals corresponding to in-phase TE polarization optical signals, a second set of digital signals corresponding to quadrature phase (hereinafter "quad-phase") TE polarization optical signals, a third set of digital signals corresponding to in-phase TM polarization optical signals, and a fourth set of digital signals corresponding to quad-phase TM polarization optical signals). In some implementations, TX DSP 310 may apply a fast Fourier transform to convert the signal channel from a time domain to a frequency domain, and may apply a filter (e.g., a finite impulse response (FIR) filter, or some other filter) to the signal channel while the signal channel is in the frequency domain. Further, TX DSP 310 may add data, corresponding to pilot tones, to the signal channel while the signal channel is in the frequency domain.

For example, TX DSP 310 may add data (e.g., data corresponding to pilot tones) to the signal channel while in the frequency domain to convert a spectrum, associated with the signal channel, from an NRZ spectrum to a Nyquist spectrum. As described above, a signal channel having a Nyquist spectrum may have higher spectral efficiency than a signal channel having an NRZ spectrum. TX DSP 310 may also perform an inverse fast Fourier transform to convert the signal channel to the time domain and form the four sets of digital signals in the time domain such that DACs 320 may receive and process the digital signals. In some implementations, the digital signals may include the pilot tones corresponding to data added by TX DSP 310. As shown in FIG. 3, TX DSP 310 may provide the four sets of digital signals to respective DACs 320.

DACs 320 may include a signal converting device or a collection of signal converting devices. In some implementations DACs 320 may receive respective digital signals from TX DSP 310, convert the received digital signals to analog signal channels, and provide the analog signal channels to modulators 330. The analog signals may correspond to electrical signals (e.g., voltage) to drive the modulator.

Modulator 330 may include an optical modulator, such as an electro-absorption modulator (EAM), or some other type of modulator. Modulator 330 may be formed as a waveguide with electrodes for applying an electric field, based on the input voltage signal, in a direction perpendicular to the light. Alternatively, modulator 330 may be implemented based on other modulation technologies, such as electro-optic modulation. In some implementations, modulator 330 may control (modulate) the intensity and phase of an input optical light (e.g., supplied by laser 305), based on input voltage signals (e.g., signal channels provided by DACs 320) and may provide a modulated signal channel. In some implementations, the modulated signal channel may include data, associated with an input signal channel received by TX DSP 310, and may include the pilot tones corresponding to data provided by TX DSP 310 (e.g., data that converts the spectrum of the input signal channel from an NRZ spectrum to a Nyquist spectrum). In some implementations, optical transmitter 212 may include multiple modulators 330 (e.g., modulator 330-1 and modulator 330-2).

Modulator 330-1 may be used to modulate signals of the first polarization (e.g., a TM polarization). Modulator 330-2 may be used to modulate signals of the second polarization (e.g., a TE polarization). In some implementations, two DACs 320 may be associated with each polarization. In these implementations, DACs 320-1 and 320-2 may supply voltage signals to modulator 330-1, and DACs 320-3 and 320-4 may supply voltage signals to modulator 330-2. In some implementations modulators 330 may provide outputs (e.g., signal 214-1 and signal 214-2) to optical multiplexer 216. In some implementations, the outputs of modulators 330 may include the pilot tones.

While particular elements of transmitter module 210 are shown in FIG. 3, in practice, the example implementations of transmitter module 210, shown in FIG. 3, may include additional elements, fewer elements, or differently arranged elements than are shown in FIG. 3. Further, some components described as being part of transmitter module 210 may be implemented in some other module (e.g., an application specific integrated circuit (ASIC)). For example, TX DSP 310 and DAC 320 may be included in an ASIC separate from transmitter module 210.

Figure 4:
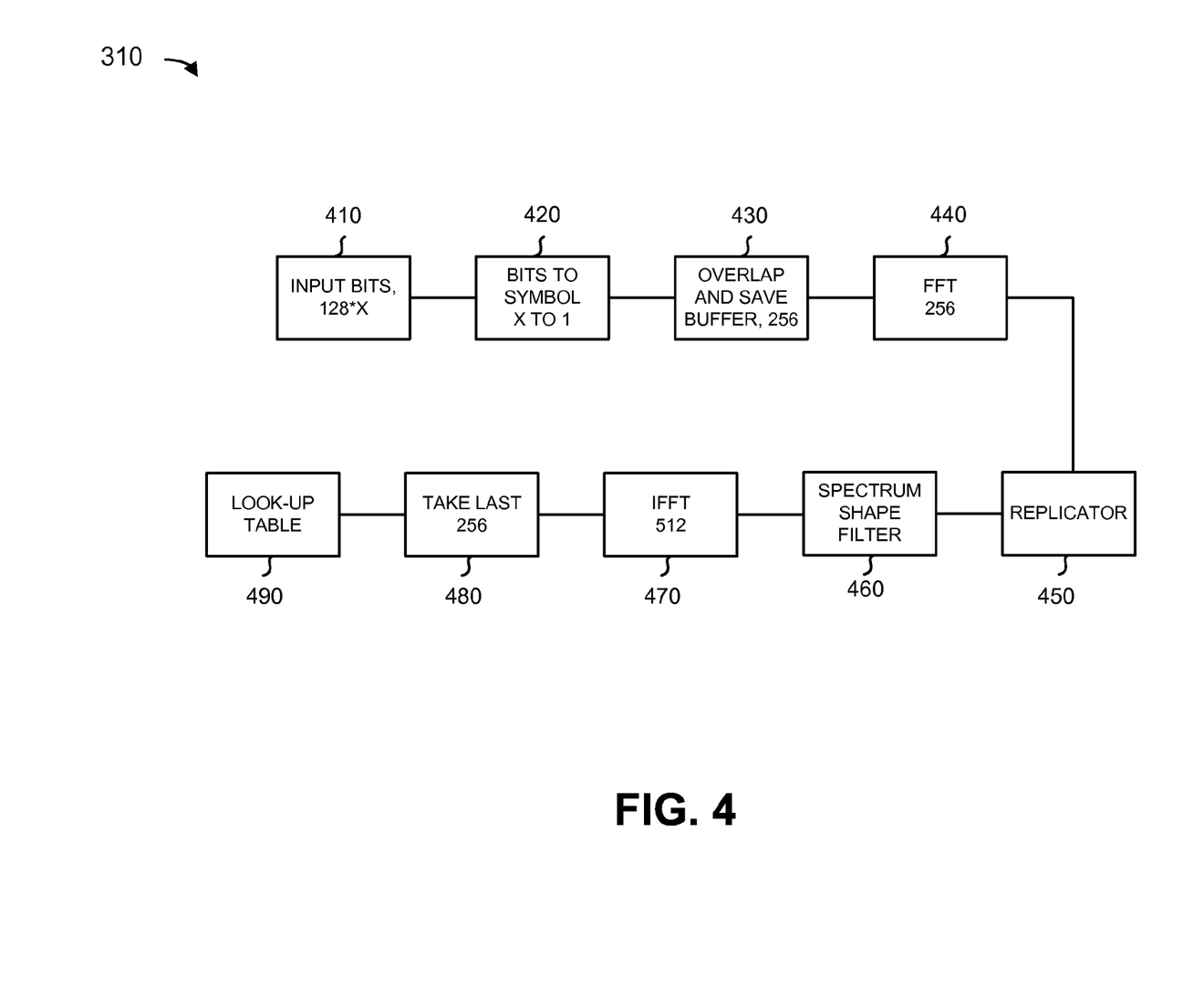
FIG. 4 is a diagram illustrating example functional components of a transmitter digital signal processor shown in FIG. 3.

FIG. 4 is a diagram illustrating example functional components of TX DSP 310. The particular functional components, which may be included in TX DSP 310, may vary based on desired performance characteristics and/or computational complexity.

As shown in FIG. 4, TX DSP 310 may include an input bits component 410, a bits to symbol component 420, an overlap and save buffer 430, a fast Fourier transfer (FFT) component 440, a replicator component 450, a spectrum shape filter 460, an inverse FFT (IFFT) component 470, a take last 256 component 480, and a look-up table component 490.

Input bits component 410 may process 128*X bits at a time of the input data, where X is an integer. For dual-polarization Quadrature Phase Shift Keying (QPSK), X would be four. Bits to symbol component 420 may map the bits to symbols on the complex plane. For example, bits to symbol component 420 may map four bits to a symbol in the dual-polarization QPSK constellation. Overlap and save buffer 430 may buffer 256 symbols. Overlap and save buffer 430 may receive 128 symbols at a time from bits to symbol component 420. Thus, overlap and save buffer 430 may combine 128 new symbols, from bits to symbol component 420, with the previous 128 symbols received from bits to symbol component 420.

FFT component 440 may receive 256 symbols from overlap and save buffer 430, and may convert the symbols to the frequency domain using, for example, a fast Fourier transform (FFT). FFT component 440 may form 256 frequency bins as a result of performing the FFT. Replicator component 450 may replicate the 256 frequency bins to form 512 frequency bins. This replication may increase the sample rate.

Spectrum shape filter 460 may apply a pulse shaping filter to the 512 frequency bins. The purpose of spectrum shape filter 460 is to calculate the transitions between the symbols and the desired spectrum so that channels can be packed together on a super-channel. Spectrum shape filter 460 may also be used to introduce timing skew between the channels to correct for timing skew induced by link 230.

In some implementations, spectrum shape filter 460 may add data (e.g., data corresponding to pilot tones) to a spectrum (e.g., a spectrum associated with the 512 frequency bins) while the spectrum is in the frequency domain. For example, spectrum shape filter 460 may add data to shape an NRZ spectrum to convert the NRZ spectrum to a Nyquist spectrum.

IFFT component 470 may receive the 512 frequency bins and return the signal back to the time domain, which may now be at the operating speed of DAC 320. In some implementations, the signal may include pilot tones. IFFT component 470 may convert the signal to the time domain using, for example, an inverse fast Fourier transform (IFFT). Take last 256 component 480 may select the last 256 samples from IFFT component 470. Look-up table 490 may include a table that identifies the integers to supply to DAC 320 based on the samples from take last 256 component 480. In one example implementation, look-up table 490 may include electrical field values and associated voltage signals. Look-up table 490 may use the samples to identify and output the appropriate integers. As explained above, DAC 320 may generate voltage signals based on the integers from TX DSP 310.

While FIG. 4 shows TX DSP 310 as including a particular quantity and arrangement of functional components, in some implementations, TX DSP 310 may include additional functional components, fewer functional components, different functional components, or differently arranged functional components.

Figure 5:
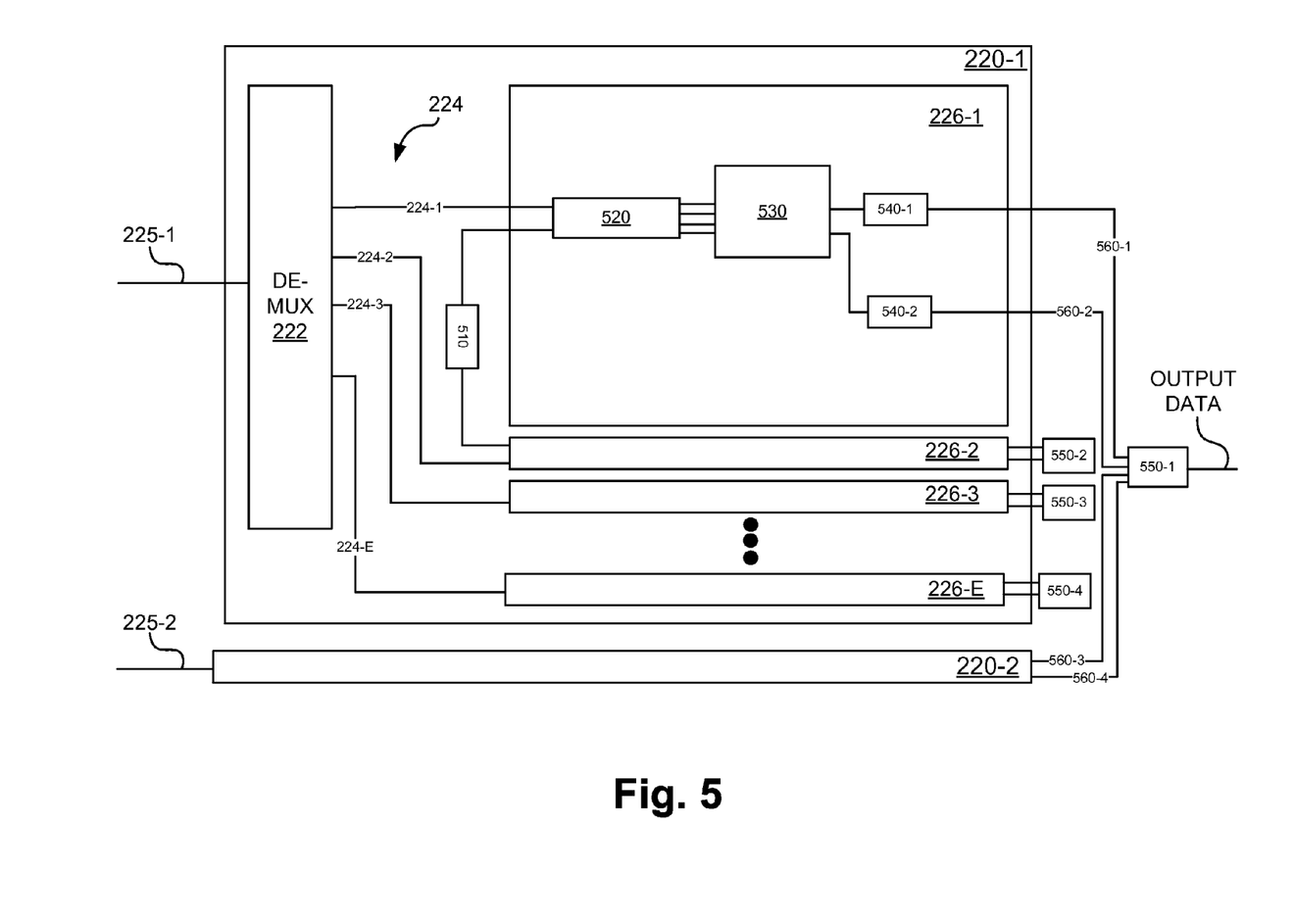
FIG. 5 is a diagram illustrating an example of components of an optical receiver, shown in FIG. 2, according to some implementations.

FIG. 5 is a diagram illustrating example elements of receiver module 220 as shown in FIG. 1. As shown in FIG. 5, receiver module 220 may include optical demultiplexer 222, waveguides 224, local oscillator 510, and/or optical receivers 226.

Waveguides 224 may include individual waveguides associated with individual signal channels outputted by optical demultiplexer 222. For example, waveguides 224 may include corresponding waveguides to transmit signal channels 224-1 through 224-E (where E≥1), to optical receivers 226-1 through 226-E, respectively.

Local oscillator 510 may include a laser, a collection of lasers, or some other device. In some implementations, local oscillator 510 may include a laser to provide an optical signal to optical receivers 226. In some implementations, local oscillator 510 may include a single-sided laser to provide an optical signal to a coupler. In some other implementations, local oscillator 510 may include a double-sided laser to provide optical signals to respective optical receivers 226. Receiver module 220 may include multiple local oscillators 510, to provide optical signals to respective optical receivers 226. For clarity, one two local oscillator 510 is shown in FIG. 5. In practice, receiver module 220 may include multiple local oscillators 510 such that each optical receiver 226 receives an optical source provided by local oscillator 510.

As further shown in FIG. 5, optical receivers 226 may each include MMI coupler 520, detector 530, and analog-to-digital converts (ADCs) 540-1 and 540-2. In some implementations, optical receivers 226 may provide electrical signals to RX DSP 550.

MMI coupler 520 may include an optical device to receive a signal channel supplied by optical demultiplexer 222 and/or an optical signal from local oscillator 510. In some implementations, MMI coupler 520 may supply multiple signals, associated with the received signal channel and the optical signal from local oscillator 510, to detector 530.

Detector 530 may include a photodetector, such as a photodiode, to receive the output optical signal, from MMI coupler 520, and convert the output optical signal to corresponding voltage signals. In some implementations, detector 530 may detect an entire spectrum of a received optical signal (e.g., a spectrum of an optical signal including the pilot tones).

ADC 540 may include a device to convert an electrical signal, provided by detector 530, from an analog signal to a digital signal. As shown in FIG. 5, optical receiver 226 may include a pair of ADCs 540 to receive respective electrical signals provided by detector 530. In some implementations, ADC 540 may provide (e.g., to RX DSP 550) a quad-phase signal associated with the TM polarization, an in-phase signal associated with the TM polarization, a quad-phase signal associated with the TE polarization or, an in-phase signal associated with the TE polarization. For example, ADCs 540 may provide digital signal 560-1, digital signal 560-2, digital signal 560-3, or digital signal 560-4.

RX DSP 550 may include a processing device, or a collection of processing devices to decode and interpret data associated with a digital signal. In some implementations, RX DSP 550 may include a multiple polarization processor to process digital signals associated with multiple polarizations (e.g., the TM polarization and the TE polarization). In some implementations, RX DSP 550 may provide output data corresponding to received digital signals. The output data may relate to data associated with a signal channel received by receiver module 220. RX DSP 550 may recover the signal channel by providing the output data.

As shown in FIG. 5, in some implementations, RX DSP 550 may receive digital electrical signals from multiple receiver modules 226 (e.g., via multiple ADCs 540). For example, RX DSP 550 may receive, from a first receiver module, a quad-phase signal associated with the TM polarization and an in-phase signal associated with the TM polarization. Further, RX DSP 550 may receive, from a second receiver module, a quad-phase signal associated with the TE polarization and an in-phase signal associated with the TE polarization.

For example, assume that optical signal 225-1 includes components having the TM polarization. Thus, digital signal 560-1 and digital signal 560-2 may be associated with the TM polarization. Further, assume that optical signal 225-2 includes components having the TE polarization. Thus, digital signal 560-3 and digital signal 560-4 may be associated with the TE polarization. Given these assumptions, RX DSP 550 may receive, from a first receiver module (e.g., receiver module 220-1) a quad-phase signal associated with the TM polarization (e.g., digital signal 560-1) and an in-phase signal associated with the TM polarization (e.g., digital signal 560-2). Further, RX DSP 550 may receive, from a second receiver module (e.g., receiver module 220-2), a quad-phase signal associated with the TE polarization (e.g., digital signal 560-3) and an in-phase signal associated with the TE polarization (e.g., digital signal 560-4). RX DSP 550 may decode, process, and interpret data associated with the received digital signals (digital signals 560-1 through 560-4).

As described above, corresponding optical signals may include pilot tones corresponding to a phase. Thus, digital signal 560-1 through digital signal 560-4 may include pilot tones corresponding to data added by TX DSP 310 (e.g., data that modifies respective spectrums of digital signal 560-1 through digital signal 560-4), as described above. RX DSP 550 may identify a phase associated with the pilot tones, and may apply the phase to digital signal 560-1 through digital signal 560-4. For example, RX DSP 550 may multiply each digital signal 560-1 through digital signal 560-4 by the phase. Further, RX DSP 550 may process digital signal 560-1 through digital signal 560-4 after multiplying digital signal 560-1 through digital signal 560-4 by the phase (e.g., to remove nonlinearities when processing digital signal 560-1 through digital signal 560-4).

In some implementations, digital signal 560-1 through digital signal 560-4 may include a phase difference between a phase associated with a signal provided by local oscillator 510 and a phase associated with a signal channel provided by optical demultiplexer 222. In some implementations, RX DSP 550 may identify the phase difference and apply the phase difference to digital signal 560-1 through digital signal 560-4. For example, RX DSP 550 may digitally rotate digital signal 560-1 through digital signal 560-4 based on the phase difference (e.g., to remove nonlinearities when processing digital signal 560-1 through digital signal 560-4). As a result, the signals processed by RX DSP 550 may include fewer nonlinearities than signals that do not have the pilot tones, as described above.

In some implementations, digital signal 560-1 through digital signal 560-4 may be x-polarized or y-polarized. RX DSP 250 may identify a phase difference between the polarizations of digital signals and my process the digital signals based on the difference between the polarizations of the digital signals.

While a particular number of components and signals are shown in FIG. 5, for clarity, some components and some signals have been omitted in FIG. 5. For example, each optical receiver 226 may provide digital signals to a particular one of any number of DSPs 550. Additionally, each receiver module 220 may include any number of optical receivers 226. Further, some components described as being part of receiver module 220 may be implemented in some other module (e.g., an application specific integrated circuit (ASIC)). For example, RX DSP 550 and ADC 540 may be included in an ASIC separate from receiver module 220.

As described above, TX DSP 310 may add data, corresponding to pilot tones, by converting a received signal channel from a time domain to a frequency domain, adding data to the received signal channel while the received signal channel is in the frequency domain, and converting the received signal channel to the time domain for processing by DACs 320. Optical transmitters 212 may provide modulated signal channels having pilot tones such that optical receivers 226 may provide corresponding digital signals having the pilot tones for processing by RX DSP 550. Further, RX DSP 550 may process digital signals having the pilot tones and may apply a phase difference, associated with the pilot tones, to the digital signals when processing the digital signals. As a result, the signals processed by RX DSP 550 may include fewer nonlinearities than signals that do not have the pilot tones.

The foregoing description provides illustration and description, but is not intended to be exhaustive or to limit the possible implementations to the precise form disclosed.

Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system comprising:
    an optical transmitter including:
        a digital signal processor (DSP) configured to receive a signal channel, add data corresponding to a pilot tone having a phase, generate a digital signal associated with the signal channel, and output the digital signal,
        a digital-to-analog converter (DAC) configured to convert the digital signal to an analog signal,
        a laser configured to provide an optical signal, and
        a modulator configured to receive the optical signal and the analog signal, and modulate the optical signal based on the analog signal to form a modulated optical signal,
            the modulated optical signal including the pilot tone; and
    an optical receiver configured to:
        receive the modulated optical signal,
        process the modulated optical signal to determine the phase associated with the pilot tone, and
        apply the phase to the modulated optical signal to recover the signal channel,
    where the DSP is a first DSP, the digital signal is a first digital signal, the laser is a first laser, and the optical signal is a first optical signal, the optical receiver including:
    a second laser configured to provide a second optical signal;
    a coupler configured to receive the second optical signal and the modulated optical signal, and to provide a third optical signal based on the second optical signal and the modulated optical signal;
    a detector configured to receive the third optical signal and provide an electrical signal corresponding to the third optical signal or corresponding to the modulated optical signal;
    an analog-to-digital converter (ADC) configured to receive the electrical signal and convert the electrical signal to a second digital signal; and
    a second DSP configured to receive the second digital signal, process the second digital signal to determine the phase associated with the pilot tone, apply the phase to the second digital signal, to recover the signal channel, and output the recovered signal channel,
    where the optical receiver processing the modulated optical signal and applying the phase corresponds to the second DSP processing the second digital signal and applying the phase.

2. An optical system comprising:
    an optical transmitter including:
        a digital signal processor (DSP) configured to receive a signal channel, add data corresponding to a pilot tone having a phase, generate a digital signal associated with the signal channel, and output the digital signal,
        a digital-to-analog converter (DAC) configured to convert the digital signal to an analog signal,
        a laser configured to provide an optical signal, and
        a modulator configured to receive the optical signal and the analog signal, and modulate the optical signal based on the analog signal to form a modulated optical signal,
            the modulated optical signal including the pilot tone; and
    an optical receiver configured to:
        receive the modulated optical signal,
        process the modulated optical signal to determine the phase associated with the pilot tone, and
        apply the phase to the modulated optical signal to recover the signal channel,
    where the optical transmitter is one of a plurality of optical transmitters,
    each of the plurality of optical transmitters being configured to receive respective signal channels each having a respective phase, add respective pilot tones associated with the respective phases of the respective signal channels, and provide respective modulated optical signals,
        the modulated signal being one of the respective modulated optical signals;
    the optical system further comprising:
        an optical multiplexer configured to receive the respective modulated optical signals and to combine the respective modulated optical signals to form a combined modulated optical signal; and
        an optical demultiplexer configured to receive the combined modulated optical signal and to form the modulated optical signal based on the combined modulated optical signal,
        the optical receiver receiving the modulated optical signal from the optical demultiplexer.

3. The optical system in accordance with claim 2, where the optical demultiplexer forms a plurality of modulated optical signals based on the combined modulated optical signal,
    the optical receiver being one of a plurality of optical receivers configured to receive the plurality of modulated optical signals and to process the plurality of modulated optical signals.

4. The optical system in accordance with claim 1, where the digital signal is associated with one of a plurality of polarizations.

5. An optical system comprising:
    an optical transmitter including:
        a digital signal processor (DSP) configured to receive a signal channel, add data corresponding to a pilot tone having a phase, generate a digital signal associated with the signal channel, and output the digital signal,
        a digital-to-analog converter (DAC) configured to convert the digital signal to an analog signal,
        a laser configured to provide an optical signal, and a modulator configured to receive the optical signal and the analog signal, and modulate the optical signal based on the analog signal to form a modulated optical signal, the modulated optical signal including the pilot tone; and an optical receiver configured to:

receive the modulated optical signal, process the modulated optical signal to determine the phase associated with the pilot tone, and apply the phase to the modulated optical signal to recover the signal channel, the DSP comprising:

a fast Fourier transfer (FFT) component configured to convert the signal channel to a frequency domain;

a spectrum shape filter to add the pilot tone to the signal channel in the frequency domain; and an inverse FFT (IFFT) component configured to convert the signal channel from the frequency domain to a time domain to form the digital signal.

6. An optical system comprising:

an optical transmitter including:

a digital signal processor (DSP) configured to receive a signal channel, add data corresponding to a pilot tone having a phase, generate a digital signal associated with the signal channel, and output the digital signal, a digital-to-analog converter (DAC) configured to convert the digital signal to an analog signal, a laser configured to provide an optical signal, and a modulator configured to receive the optical signal and the analog signal, and modulate the optical signal based on the analog signal to form a modulated optical signal, the modulated optical signal including the pilot tone; and an optical receiver configured to:

receive the modulated optical signal, process the modulated optical signal to determine the phase associated with the pilot tone, and apply the phase to the modulated optical signal to recover the signal channel, where the DSP, when adding the pilot tone, converts a spectrum of the signal channel from a nonreturn-to-zero (NRZ) spectrum to a Nyquist spectrum.

7. An optical system, comprising:

an optical transmitter configured to:

receive a signal channel, add data corresponding to a pilot tone having a phase to the signal channel, generate a digital signal associated with the signal channel, the digital signal including the pilot tone, convert the digital signal to an analog signal, modulate an optical signal based on the analog signal to form a modulated optical signal having the pilot tone, and output the modulated optical signal; and an optical receiver configured to:

receive the modulated optical signal, process the modulated optical signal to determine the phase associated with the pilot tone, and apply the phase to the modulated optical signal to recover the signal channel, where the optical transmitter includes:

a digital signal processor (DSP) configured to receive the signal channel, add the pilot tone, generate the digital signal associated with the signal channel, and output the digital signal;

a digital-to-analog converter (DAC) configured to convert the digital signal to the analog signal;

a laser configured to provide the optical signal; and a modulator configured to receive the optical signal and the analog signal, and modulate the optical signal based on the analog signal to form the modulated optical signal, and output the modulated optical signal, where the DSP includes:

a fast Fourier transfer (FFT) component configured to convert the signal channel to a frequency domain;

a spectrum shape filter configured to add the pilot tone to the signal channel in the frequency domain; and an inverse FFT (IFFT) component configured to convert the signal channel from the frequency domain to a time domain to form the digital signal.

8. The optical system in accordance with claim 7, where the digital signal is associated with one of a plurality of polarizations.

9. An optical system comprising:

an optical transmitter configured to:

receive a signal channel, add data corresponding to a pilot tone having a phase to the signal channel, generate a digital signal associated with the signal channel, the digital signal including the pilot tone, convert the digital signal to an analog signal, modulate an optical signal based on the analog signal to form a modulated optical signal having the pilot tone, and output the modulated optical signal; and an optical receiver configured to:

receive the modulated optical signal, process the modulated optical signal to determine the phase associated with the pilot tone, and apply the phase to the modulated optical signal to recover the signal channel, where the optical transmitter, when adding the pilot tone, converts a spectrum of the signal channel from a nonreturn-to-zero (NRZ) spectrum to a Nyquist spectrum.

10. An optical system comprising:

an optical transmitter configured to:

receive a signal channel, add data corresponding to a pilot tone having a phase to the signal channel, generate a digital signal associated with the signal channel, the digital signal including the pilot tone, convert the digital signal to an analog signal, modulate an optical signal based on the analog signal to form a modulated optical signal having the pilot tone, and output the modulated optical signal; and an optical receiver configured to:

receive the modulated optical signal, process the modulated optical signal to determine the phase associated with the pilot tone, and apply the phase to the modulated optical signal to recover the signal channel, where the digital signal is a first digital signal and the optical signal is a first optical signal, the optical receiver including:

a laser configured to provide a second optical signal;

a coupler configured to receive the second optical signal and the modulated optical signal, and to provide a second optical signal based on the first optical signal and the modulated optical signal;

a detector configured to receive the second optical signal and provide an electrical signal corresponding to the second optical signal or corresponding to the modulated optical signal;

an analog-to-digital converter (ADC) configured to receive the electrical signal and convert the electrical signal to a second digital signal; and a digital signal processor (DSP) configured to receive the second digital signal, process the second digital signal to determine the phase associated with the pilot tone, apply the phase to the second digital signal, to recover the signal channel, and output the recovered signal channel, where the optical receiver processing the modulated optical signal and applying the phase corresponds to the second DSP processing the second digital signal and applying the phase.

11. An optical system comprising:
an optical transmitter configured to:
 receive a signal channel,
  add data corresponding to a pilot tone having a phase to the signal channel,
  generate a digital signal associated with the signal channel, the digital signal including the pilot tone,
  convert the digital signal to an analog signal,
  modulate an optical signal based on the analog signal to form a modulated optical signal having the pilot tone, and
  output the modulated optical signal; and
an optical receiver configured to:
 receive the modulated optical signal,
 process the modulated optical signal to determine the phase associated with the pilot tone, and
 apply the phase to the modulated optical signal to recover the signal channel, where the optical transmitter is one of a plurality of optical transmitters,
 each of the plurality of optical transmitters being configured to receive respective signal channels each having a respective phase, add respective pilot tones associated with the respective phases of the respective signal channels, and provide respective modulated optical signals, the modulated signal being one of the respective modulated optical signals;
the optical system further comprising:
 an optical multiplexer configured to receive the respective modulated optical signals and to combine the respective modulated optical signals to form a combined modulated optical signal; and
 an optical demultiplexer configured to receive the combined modulated optical signal and form the modulated optical signal based on the combined modulated optical signal,
 the optical receiver receiving the modulated optical signal from the optical demultiplexer.

12. The optical system in accordance with claim 11, where the optical demultiplexer forms a plurality of modulated optical signals based on the combined modulated optical signal,
the optical receiver being one of a plurality of optical receivers configured to receive the plurality of modulated optical signals and to process the plurality of modulated optical signals.

13. An optical transmitter comprising:
a digital signal processor (DSP) configured to:
 receive a signal channel,
 add data corresponding to a pilot tone having a phase to the signal channel,
 form a digital signal associated with the signal channel, the digital signal including the pilot tone, and
 output the digital signal;
a digital-to-analog converter (DAC) configured to convert the digital signal to an analog signal;
a laser configured to provide an optical signal; and
a modulator configured to:
 receive the optical signal and the analog signal, and
 modulate the optical signal based on the analog signal to form a modulated optical signal having the pilot tone, and
 output the modulated optical signal for transmission to an optical receiver, the optical receiver processing the modulated optical signal to determine the phase associated with the pilot tone and applying the phase to the modulated optical signal to recover the signal channel,
where the optical transmitter is one of a plurality of optical transmitters,
each of the plurality of optical transmitters being configured to receive respective signal channels each having a respective phase, add respective pilot tones associated with respective phases of the respective signal channels, and provide respective modulated optical signals to an optical multiplexer,
the optical multiplexer receiving the respective modulated optical signals and combining the respective modulated optical signals to form a combined modulated optical signal,
 the modulated signal corresponding to the combined modulated signal.

14. The optical transmitter in accordance with claim 13, where the digital signal is one of a plurality of digital signals and the DAC is one of a plurality of DACs,
each of the plurality of DACs being configured to receive one of the plurality of digital signals,
plurality of digital signals corresponding to one or more of an in-phase signal having transverse magnetic (TM) components, a quadrature-phase signal having TM components, an in-phase signal having transverse electric (TE) components, or a quadrature-phase signal having TE components.

15. The optical transmitter in accordance with claim 13, where the DSP, when adding the pilot tone, converts a spectrum of the signal channel from a nonreturn-to-zero (NRZ) spectrum to a Nyquist spectrum.

16. An optical transmitter comprising:
a digital signal processor (DSP) configured to:
 receive a signal channel,
 add data corresponding to a pilot tone having a phase to the signal channel,
 form a digital signal associated with the signal channel, the digital signal including the pilot tone, and
 output the digital signal;
a digital-to-analog converter (DAC) configured to convert the digital signal to an analog signal;
a laser configured to provide an optical signal; and
a modulator configured to:
 receive the optical signal and the analog signal, and
 modulate the optical signal based on the analog signal to form a modulated optical signal having the pilot tone, and output the modulated optical signal for transmission to an optical receiver, the optical receiver processing the modulated optical signal to determine the phase associated with the pilot tone and applying the phase to the modulated optical signal to recover the signal channel,
where the DSP includes:

a fast Fourier transfer (FFT) component configured to convert the signal channel to a frequency domain;
a spectrum shape filter configured to add the pilot tone to the signal channel in the frequency domain; and
an inverse FFT (IFFT) component configured to convert the signal channel from the frequency domain to a time domain to form the digital signal.

\* \* \* \* \*